(12) United States Patent
Henry (10) Patent No.: US 11,566,997 B2
(45) Date of Patent: Jan. 31, 2023

(54) SYSTEM AND METHOD FOR MONITORING SOIL COMPOSITION AT DIFFERENT DEPTHS WITHIN A FIELD

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 384 days.

(21) Appl. No.: 16/742,299

(22) Filed: Jan. 14, 2020

(65) Prior Publication Data

US 2021/0215595 A1 Jul. 15, 2021

(51) Int. Cl.
| | |
|---|---|
| *G01N 21/25* | (2006.01) |
| *G01N 21/84* | (2006.01) |
| *A01B 15/18* | (2006.01) |
| *G01N 21/27* | (2006.01) |
| *A01B 79/00* | (2006.01) |
| *A01B 49/02* | (2006.01) |

(52) U.S. Cl.
CPC .......... *G01N 21/255* (2013.01); *A01B 15/18* (2013.01); *A01B 79/005* (2013.01); *G01N 21/27* (2013.01); *G01N 21/84* (2013.01); *A01B 49/02* (2013.01); *G01N 2201/0216* (2013.01); *G01N 2201/062* (2013.01)

(58) Field of Classification Search
CPC ...... G01N 21/255; G01N 21/27; G01N 21/84; G01N 2201/0216; G01N 2201/062; A01B 15/18; A01B 79/005; A01B 49/02
See application file for complete search history.

(56) References Cited

U.S. PATENT DOCUMENTS

| 5,038,040 A | * | 8/1991 | Funk et al. .......... A01C 21/007 |
| | | | 250/341.8 |
| 6,883,299 B1 | | 4/2005 | Gramm |
| 8,365,679 B2 | | 2/2013 | Landphair et al. |
| 9,026,321 B2 | | 5/2015 | Henry et al. |
| 9,107,338 B2 | | 8/2015 | Bassett |
| 9,113,589 B2 | | 8/2015 | Bassett |
| 9,232,687 B2 | | 1/2016 | Bassett |

(Continued)

FOREIGN PATENT DOCUMENTS

| EP | 0372901 A2 | 6/1990 |
| JP | 6112076 | 4/2017 |
| WO | WO2017197274 | 11/2017 |

*Primary Examiner* — Tara Mayo-Pinnock
(74) *Attorney, Agent, or Firm* — Rebecca Henkel; Rickard DeMille (57) ABSTRACT

A system for monitoring soil composition within a field may have a ground-engaging tool configured to engage soil within a field as an implement moves across the field. The system may further have a sensor configured to generate data indicative of a soil composition within the field, where the sensor is movable relative to the ground-engaging tool while the implement moves across the field such that the sensor generates data indicative of the soil composition at different depths within the field. Additionally, the system may have a controller communicatively coupled to the sensor, with the controller being configured to determine the soil composition at the different depths within the field based at least in part on the data received from the sensor.

19 Claims, 6 Drawing Sheets

(56) References Cited

U.S. PATENT DOCUMENTS

| | | |
|---|---|---|
| 9,651,536 B1 | 5/2017 | Lund et al. |
| 9,943,027 B2 | 4/2018 | Sauder et al. |
| 10,255,770 B2 | 4/2019 | Barker |
| 2009/0112475 A1* | 4/2009 | Christy et al. ..... G01N 21/3563 702/5 |
| 2013/0032362 A1 | 2/2013 | Rylander |
| 2017/0094889 A1 | 4/2017 | Garner et al. |
| 2018/0116098 A1* | 5/2018 | Bassett ................. A01C 5/064 |
| 2018/0168094 A1 | 6/2018 | Koch et al. |

* cited by examiner

SYSTEM AND METHOD FOR MONITORING SOIL COMPOSITION AT DIFFERENT DEPTHS WITHIN A FIELD

FIELD OF THE INVENTION

The present disclosure relates generally to monitoring soil composition within the field and, more particularly, to systems and methods for monitoring soil composition at different depths within a field while performing an agricultural operation with an associated agricultural implement.

BACKGROUND OF THE INVENTION

A wide range of agricultural implements have been developed and are presently in use for tilling, cultivating, harvesting, and so forth. Tillage implements, for example, are commonly towed behind tractors and may cover wide swaths of ground that include various types of residue. Accordingly, tillers typically include ground-engaging tools, such as coulters, shanks, tillage points, and/or the like, configured to condition the soil for improved soil composition, such as organic matter, residue, and/or moisture content or distribution while reducing soil compaction from such sources as machine traffic, grazing cattle, and standing water. The ground-engaging tools may be selected depending upon the field conditions and the desired results of the tilling operation. Conventional tillage practices include setting a predetermined penetration depth for the ground-engaging tools of the implement and pulling the implement across a field to till the soil.

The soil composition of the field may affect subsequent operations within the field, such as fertilizing, seeding, planting, etc. For example, the desired penetration depth and/or force applied to furrow-closing tools of a seed-planting implement may be based on the soil composition of the field. Typically, soil sensors provided in association with tillage implements are only configured to generate data indicative of the soil composition at one depth within the field. However, the soil composition at different depths within the field may vary significantly, which may affect the quality of subsequent field operations.

Accordingly, an improved system and method for monitoring the soil composition at different depths within a field would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring soil composition within a field, where the system includes a ground-engaging tool configured to engage soil within a field as an implement moves across the field. The system further includes a sensor configured to generate data indicative of a soil composition within the field, with the sensor being movable relative to the ground-engaging tool while the implement moves across the field such that the sensor generates data indicative of the soil composition at different depths within the field. Additionally, the system includes a controller communicatively coupled to the sensor. The controller is configured to determine the soil composition at the different depths within the field based at least in part on the data received from the sensor.

In another aspect, the present subject matter is directed to a method for collecting soil composition data within a field as an implement moves across a field, where the implement has a ground-engaging tool. The method includes performing a ground-engaging operation with the ground-engaging tool of the implement as the implement moves across the field. The method further includes moving a sensor relative to the ground-engaging tool during the ground-engaging operation between a raised position and a lowered position, where the sensor is configured to generate data indicative of a soil composition within the field. Moreover, the method includes receiving, with a computing device, the data from the sensor indicative of at least the soil composition at a first depth when the sensor is in the raised position and the soil composition at a second depth when the sensor is in the lowered position. Additionally, the method includes determining, with the computing device, the soil composition within the field based on the received data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the soil composition at different depths within a field as an agricultural implement moves across the field. Specifically, in several embodiments, as the agricultural implement is moved across a field to perform an agricultural operation, a controller of the disclosed system may be configured to receive data from a soil sensor positioned behind a ground-engaging tool of the agricultural implement. More particularly, in accordance with aspects of the present subject matter, the soil sensor may be configured to move relative to the ground-engaging tool as the agricultural implement moves across the field to generate data indicative of the soil composition at different depths within the field. For example, in some embodiments, the soil sensor may be movable relative to the ground-engaging tool by an actuator controlled by the controller. In other embodiments, the soil sensor may be moved based on movement of the associated ground-engaging tool while the implement moves across the field. For example, in one embodiment, a cam or an actuating disc may be coupled to a ground-engaging tool for rotation with the ground-engaging tool about a rotational axis as the implement is towed across the field, where rotation of the cam or the actuating disc about the rotational axis causes movement of the sensor relative to the ground-engaging tool. As such, the controller may be configured to determine the soil composition at different depths within the field across which the implement is moved based on the received data. In some embodiments, the controller may further be configured to generate a field map identifying the soil composition at a plurality of locations and depths within the field.

Figure 1:
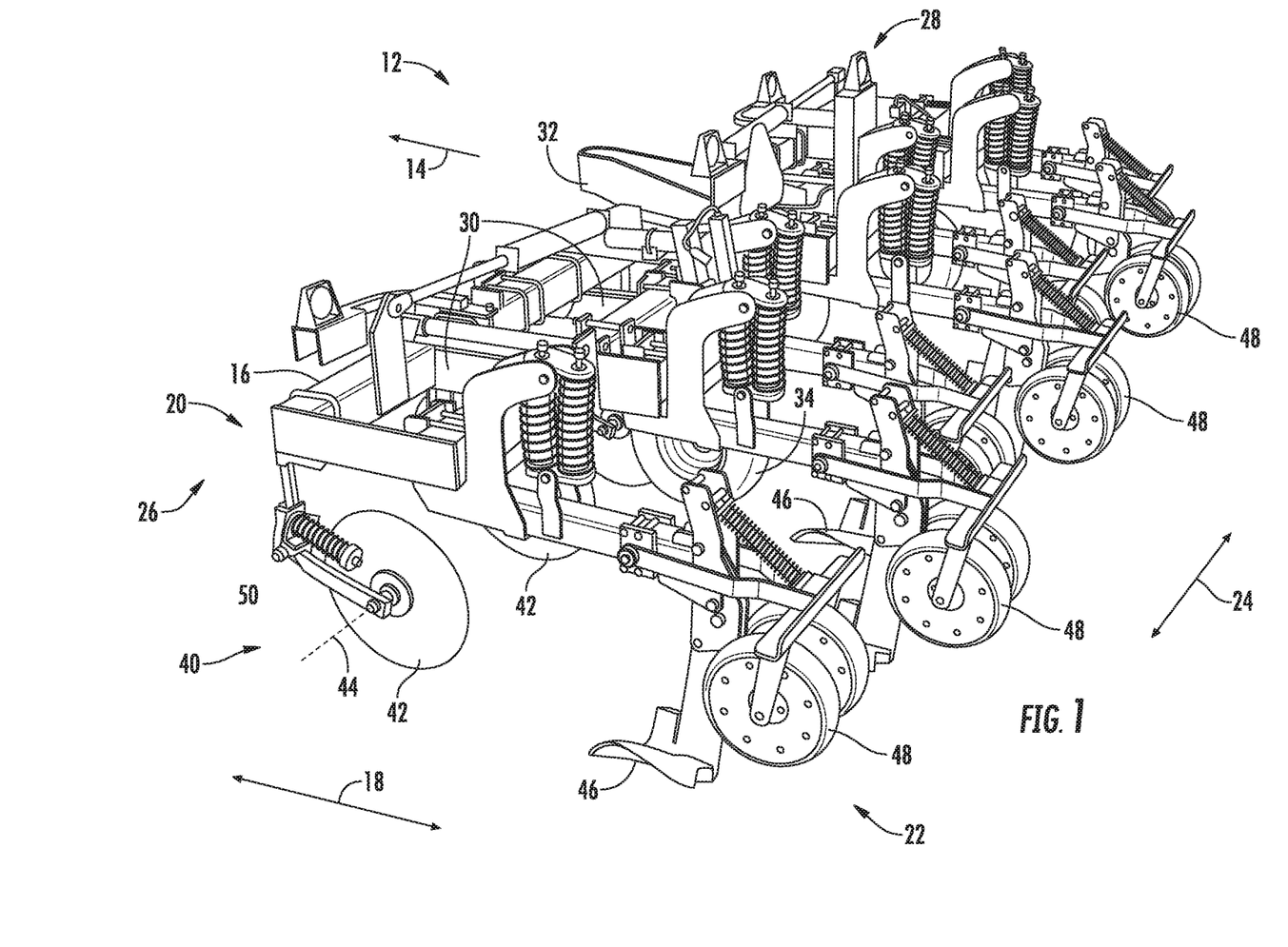
FIG. 1 illustrates a illustrates a perspective view of one embodiment of an agricultural implement in accordance with aspects of the present subject matter.

Referring now to the drawings, FIG. 1 illustrates a perspective view of one embodiment of an agricultural implement 12 in accordance with aspects of the present subject matter. In the illustrated embodiment, the agricultural implement 12 corresponds to a tillage implement configured to be towed across a field in a direction of travel (e.g., as indicated by arrow 14). However, in other embodiments, the agricultural implement 12 may be configured as any other suitable implement (e.g., planter, seeder, fertilizer, and/or the like.

As shown in FIG. 1, the implement 12 may include a frame 16. More specifically, the frame 16 may extend along a longitudinal direction 18 between a forward end 20 and an aft end 22. The frame 16 may also extend along a lateral direction 24 between a first side 26 and a second side 28. In this respect, the frame 16 generally includes a plurality of structural frame members 30, such as beams, bars, and/or the like, configured to support or couple to a plurality of components. Furthermore, a hitch assembly 32 may be connected to the frame 16 and configured to couple the implement 12 to a work vehicle for towing. Additionally, a plurality of wheel assemblies may be coupled to the frame 16, such as a set of centrally located wheels 34 (one of which is shown) to facilitate towing the implement 12 in the direction of travel.

In several embodiments, the frame 16 may support a plurality of row units 40 having a plurality of ground-engaging tools configured to till or otherwise break the soil over which the implement 12 travels to create a seedbed. In this respect, each row unit 40 may include a coulter 42 which rotates about a rotational axis 44 as the implement 12 moves across the field in the direction of travel 14. The coulter 42 may be supported relative to the frame 16 by a support arm 50 in a manner that permits the penetration depth of the coulter 42 to be adjusted. Similarly, in some embodiments, each row unit 40 may include a shank 46, which is pulled through the soil as the implement 12 moves across the field in the direction of travel 14 to create a trench in the soil. Additionally, in some embodiments, each row unit 40 may include a closing assembly (e.g., pair of closing wheels 48) configured to roll over and at least partially close the trench created by the associated shank 46. The shanks 46 and closing wheels 48 may similarly be supported relative to the frame 16 in a manner that permits the penetration depth of the shanks 46 and closing force of the closing wheels 48 to be adjusted.

Additionally, it should be appreciated that the implement 12 may, in some embodiments, include any number of suitable actuators (e.g., hydraulic actuators, electric linear actuators, and/or the like) (not shown) for automatically adjusting the relative positioning, penetration depth, and/or force associated with the various ground-engaging tools of the implement 12 (e.g., ground-engaging tools 42, 46, 48). It should further be appreciated that, in some embodiments, the implement 12 may include any other suitable number of row units 40, such as more or less than the number of row units 40 illustrated.

It should also be appreciated that the configuration of the implement 12 described above is provided only to place the present subject matter in an exemplary field of use. Thus, it should be appreciated that the present subject matter may be readily adaptable to any manner of implement having any suitable ground-engaging tools (e.g., disk openers, and/or the like) for any suitable field of use, such as agriculture, construction, and/or the like.

Figure 2A:
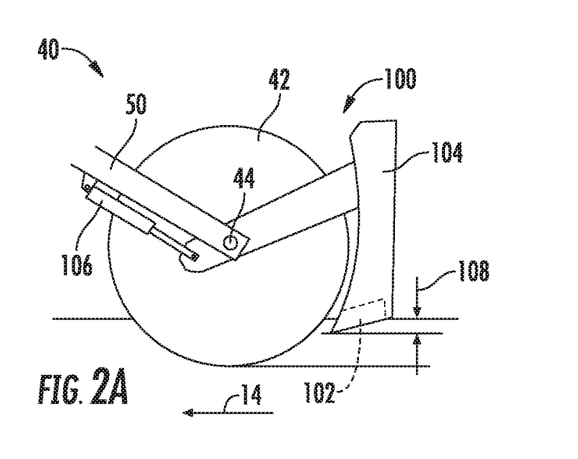
FIG. 2A illustrates a side view of a ground-engaging tool of an agricultural implement in accordance with aspects of the present subject matter, particularly illustrating components of one embodiment of a sensing assembly for monitoring the soil composition within a field.
Figure 2B:
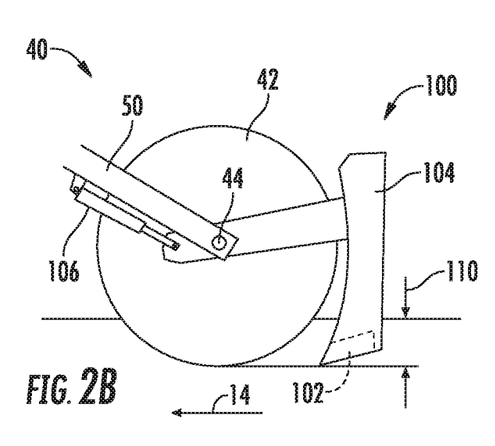
FIG. 2B illustrates another side view of the ground-engaging tool and sensing assembly shown in FIG. 2A in accordance with aspects of the present subject matter, particularly following actuation of the sensing assembly relative to the ground-engaging tool.

Referring now to FIGS. 2A-2B, various views of a portion of a ground-engaging tool of an agricultural implement and one embodiment of a sensing assembly for monitoring the soil composition within a field are illustrated in accordance with aspects of the present subject matter. More particularly, FIG. 2A illustrates a side view of the ground-engaging tool and the sensing assembly while a portion of the sensing assembly is in a first position. Additionally, FIG. 2B illustrates another side view of the ground-engaging tool and the sensing assembly following actuation of the sensing assembly relative to the ground-engaging tool from the first position shown in FIG. 2A.

In accordance with aspects of the present subject matter, a sensing assembly 100 may be associated with one of the ground-engaging tools of an agricultural implement (e.g., the implement 12 shown in FIG. 1) for monitoring the soil composition at different depths within a field as the implement 12 moves across the field. For example, as shown in FIGS. 2A and 2B, the sensing assembly 100 may be associated with the coulter 42 of the row unit 40 described above.

The sensing assembly 100 may include a soil sensor 102 configured to generate data indicative of the soil composition within the field as the implement 12 moves across the field. The sensor 102 is positioned rearward or aft of the coulter 42 along the direction of travel 14 (e.g., within a trench or cut formed by the coulter 42) and supported relative to the coulter 42 by a sensor arm 104. More particularly, the sensor arm 104 is movable relative to the coulter 42 such that the sensor 102 moves relative to the coulter 42 to generate data indicative of the soil composition at different depths within the field. For instance, the sensor arm 104 may be rotatably mounted to the support arm 50 used to mount or support the coulter 42 relative to the implement frame 16 (FIG. 1). In one embodiment, the sensor arm 104 may be mounted to the support arm 50 for rotation relative to the coulter 42 about the coulter's rotational axis 44. However, in other embodiments, the sensor arm 104 may be rotatable about a separate rotational axis from the coulter 42. It should be appreciated that the sensor arm 104 may be otherwise supported relative to the coulter 42 such that the sensor 102 has an adjustable depth relative to the coulter 42. For instance, the sensor arm 104 may be slidably mounted to the support arm 50.

The sensing assembly 100 may further include an actuator 106 configured to actuate the sensor arm 104 relative to the support arm 50 such that the sensor 102 moves relative to the coulter 42. For instance, the actuator 106 may be configured to move the sensor arm 104 relative to the support arm 50 such that the sensor 102 moves relative to the coulter 42 between a raised position (FIG. 2A) and a lowered position (FIG. 2B). For example, in one embodiment, the actuator 106 may rotate the sensor arm 104 about the rotational axis 44 to move the sensor 102 between the raised and lowered positions. When the sensor 102 is in the raised position (FIG. 2A), the sensor 102 is configured to generate data indicative of the soil composition at a first depth 108 below the field surface. When the sensor 102 is in the lowered position (FIG. 2B), the sensor 102 is configured to generate data indicative of the soil composition at a second depth 110 below the field surface, where the second depth 110 is deeper than the first depth 108. In some embodiments, the second depth 110 corresponds to the penetration depth of the coulter 42. However, in other embodiments, the second depth 110 may correspond to any other distance below the field surface. It should be appreciated that the actuator 106 may be configured as any suitable device capable of moving the sensor arm 104 relative to the coulter 42, such as a linear actuator, such as a pneumatic or fluid driven actuator, a rotary actuator, and/or the like. It should further be appreciated that the actuator 106 may move the sensor arm 104 such that the sensor 102 may be positioned at any position between the raised and lowered positions to generate data indicative of the soil composition of the field at an associated depth(s) between the first and second depths 108, 110.

Figure 6:
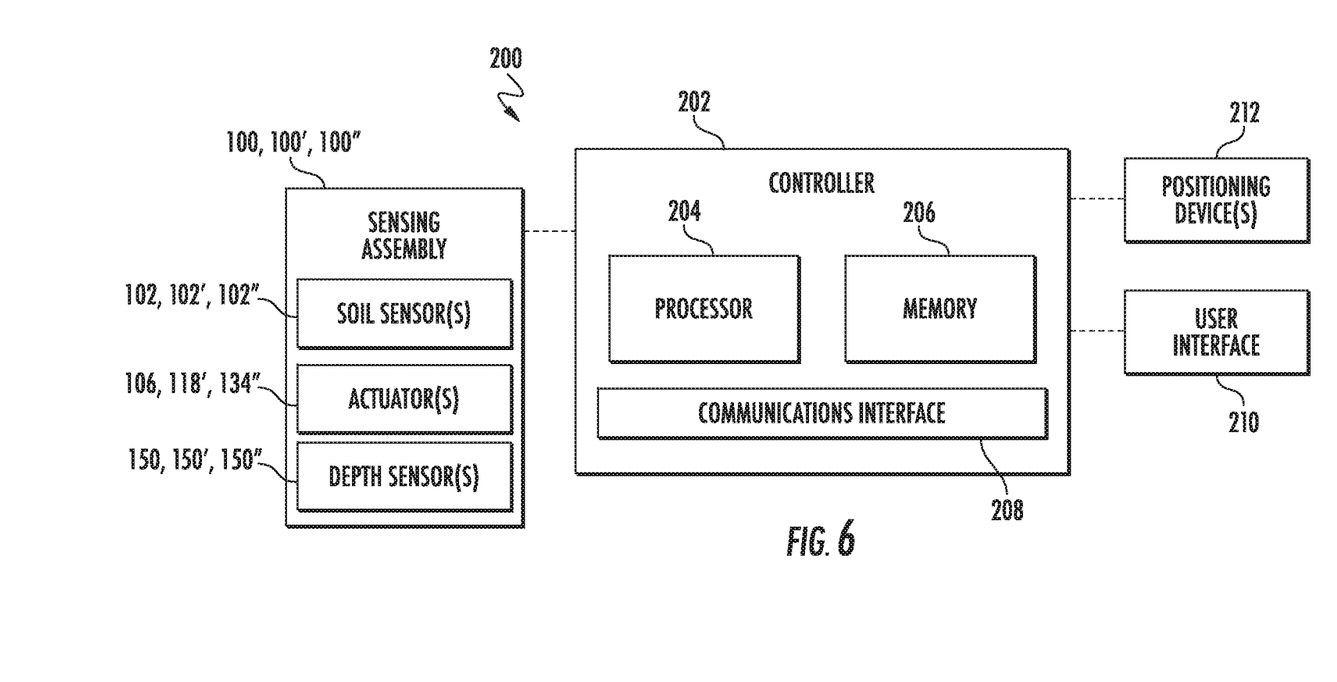
FIG. 6 illustrates a schematic view of one embodiment of a system for monitoring the soil composition within a field in accordance with aspects of the present subject matter.

The depth at which the sensor 102 generates the data indicative of the soil composition may be monitored based on the actuation (e.g., extension, retraction, and/or rotation) of the actuator 106 or using a separate depth sensor 150 (FIG. 6). In one embodiment, the depth sensor 150 may be configured as a rotational sensor configured to monitor the rotation of the sensor arm 104 about the rotational axis 44. However, it should be appreciated that the depth sensor 150 may be configured as any other suitable sensor for monitoring the depth of the sensor 102.

It should be appreciated that the sensor arm 104 may include any suitable number of soil sensors 102. For example, in one embodiment, the sensor arm 104 may only include one soil sensor 102. However, in other embodiments, the sensor arm 104 may include a plurality of soil sensors 102. In such an embodiment, several soil sensors 102 may be installed at different locations along the sensor arm 104 such that the soil composition at multiple depths may be taken at one position of the sensor arm 104.

Figure 3A:
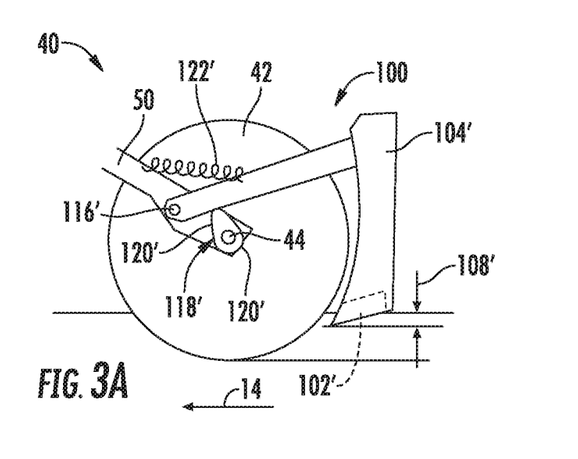
FIG. 3A illustrates a side view of a ground-engaging tool of an agricultural implement in accordance with aspects of the present subject matter, particularly illustrating components of another embodiment of a sensing assembly for monitoring the soil composition within a field.
Figure 3B:
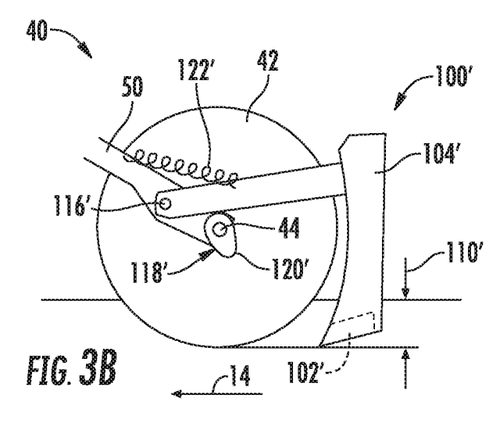
FIG. 3B illustrates another side view of the ground-engaging tool and sensing assembly shown in FIG. 3A in accordance with aspects of the present subject matter, particularly following actuation of the sensing assembly relative to the ground-engaging tool.

Referring now to FIGS. 3A-3B various views of a portion of a ground-engaging tool of an agricultural implement and another embodiment of a sensing assembly for monitoring the soil composition within a field are illustrated in accordance with aspects of the present subject matter. More particularly, FIG. 3A illustrates a side view of the ground-engaging tool and the sensing assembly while a portion of the sensing assembly is in a first position. Additionally, FIG. 3B illustrates another side view of the ground-engaging tool and the sensing assembly following actuation of the sensing assembly relative to the ground-engaging tool from the first position shown in FIG. 3A.

In the embodiment shown, a sensing assembly 100' is provided relative to the coulter 42, with the sensing assembly 100' being configured substantially similar to the sensing assembly 100. For instance, the sensing assembly 100' includes a sensor 102' configured the same as or substantially similar to the sensor 102 described above. The sensor 102' is positioned rearward or aft of the coulter 42 along the direction of travel 14 (e.g., within a trench or cut formed by the coulter 42) and is supported relative to the coulter 42 by a sensor arm 104'. The sensor arm 104' is movable relative to the coulter 42 such that the sensor 102' moves relative to the coulter 42 to generate data indicative of the soil composition at different depths within the field. For instance, the sensor arm 104' is mounted to the support arm 50 for rotation about a second rotational axis 116' spaced apart from the rotational axis 44 of the coulter 42. It should be appreciated that the sensor arm 104' may be otherwise supported relative to the coulter 42 such that the sensor 102' has an adjustable depth relative to the coulter 42. For instance, the sensor arm 104' may be as slidably mounted to the support arm 50.

Unlike the sensing assembly 100 shown in FIGS. 2A-2B, the sensing assembly 100' of FIGS. 3A-3B includes a cam actuator 118' (hereafter referred to simply as "cam 118"). In one embodiment, the cam 118' is rotationally fixed to the coulter 42 for rotation about the rotational axis 44 as the implement 12 moves across a field. However, in other embodiments, the cam 118' may be configured to rotate relative to the coulter 42 about the rotational axis 44 (e.g., using a gear train, and/or the like). The cam 118' has an outer profile 120' which extends generally parallel to the rotational axis 44 and which supports the sensor arm 104'. The outer profile 120' of the cam 118' has varying distances from the rotational axis 44 such that, as the cam 118' rotates, the distance between the sensor arm 104' and the rotational axis 44 of the cam 118' changes. For instance, the sensor 102' is in a raised position (FIG. 3A) when the cam 118' is at a first rotational position corresponding to the longest distance between the rotational axis 44 and the contact location of the sensor arm 104' on the outer profile 120' of the cam 118'. Similarly, the sensor 102' is in a lowered position (FIG. 3B) when the cam 118' is at a second rotational position corresponding to the shortest distance between the rotational axis 44 and the contact location of the sensor arm 104' on the outer profile 120' of the cam 118'. As the cam 118' rotates, the sensor 102' is moved cyclically between such raised and lowered positions.

In some embodiments, the sensing assembly 100 further includes a biasing element configured to keep the sensor arm 104' in contact with the cam 118'. For instance, in the embodiment shown, the sensing assembly 100 further includes a biasing element 122' coupled between the support arm 50 and the sensor arm 104'. The biasing element 122' is configured, in one embodiment, as a helical compression spring. However, the biasing element 122' may be configured as any other suitable biasing element configured to keep the sensor arm 104' in contact with the cam 118'. For example, the biasing element 122' may instead be configured as a pneumatic spring valve, a tension spring, a torsion spring, and/or the like coupled between any suitable elements of the sensing assembly 100 and/or elements of the row unit 40. It should also be appreciated that, in some embodiments, the weight of the sensor arm 104' and the sensor 102' is sufficient to keep the sensor arm 104' in contact with the cam 118'. As such, in some embodiments, a biasing element, such as the biasing element 122', is not necessary.

When the sensor 102' is in the raised position (FIG. 3A), the sensor 102' is configured to generate data indicative of the soil composition at a first depth 108' below the field surface. When the sensor 102' is in the lowered position (FIG. 3B), the sensor 102' is configured to generate data indicative of the soil composition at a second depth 110' below the field surface, where the second depth 110' is deeper than the first depth 108'. In some embodiments, the second depth 110' corresponds to the penetration depth of the coulter 42. However, in other embodiments, the second depth 110' may correspond to any other distance below the field surface. It should be appreciated that the outer profile 120' of the cam 118' may be configured such that the cam 118' may move the sensor arm 104' such that the sensor 102' may be positioned at any position between the raised and lowered positions to generate data indicative of the soil composition of the field at an associated depth(s) between the first and second depths 108', 110'.

The depth at which the sensor 102' generates the data indicative of the soil composition may be monitored using a depth sensor(s) 150' (FIG. 6). In one embodiment, the depth sensor(s) 150' may be configured as a rotational sensor configured to monitor the rotation of the cam 118' about the rotational axis 44 and/or of the sensor arm 104' about the second rotational axis 116'. However, it should be appreciated that the depth sensor(s) 150' may be configured as any other suitable sensor for monitoring the depth of the sensor 102'.

It should also be appreciated that the sensor arm 104' may include any suitable number of soil sensors 102'. For example, in one embodiment, the sensor arm 104' may only include one soil sensor 102'. However, in other embodiments, the sensor arm 104' may include a plurality of soil sensors 102'. In such an embodiment, several soil sensors 102' may be installed at different locations along the sensor arm 104' such that the soil composition at multiple depths may be taken at one position of the sensor arm 104'.

Figure 4A:
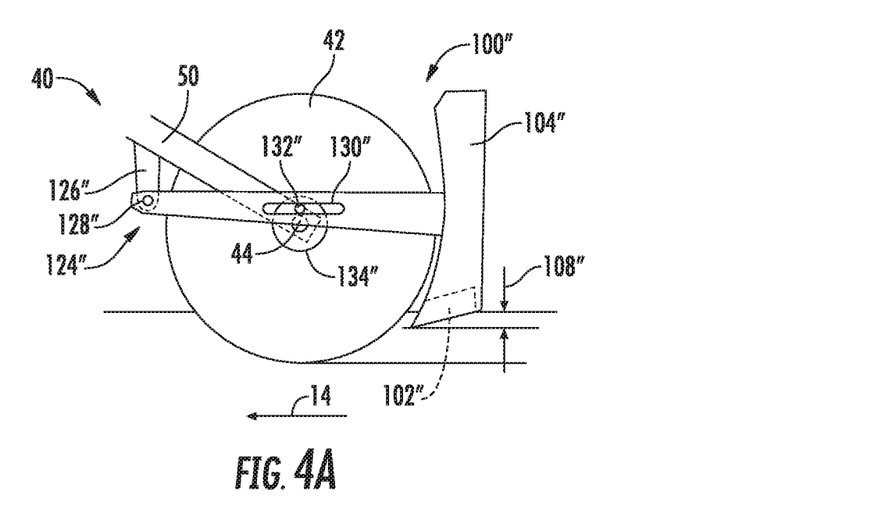
FIG. 4A illustrates a side view of a ground-engaging tool of an agricultural implement in accordance with aspects of the present subject matter, particularly illustrating components of yet another embodiment of a sensing assembly for monitoring the soil composition within a field.
Figure 4B:
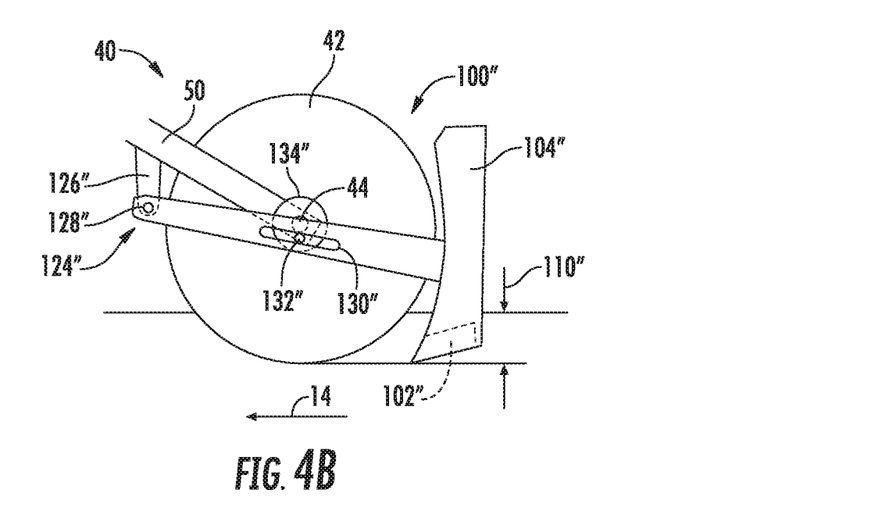
FIG. 4B illustrates another side view of the ground-engaging tool and sensing assembly shown in FIG. 4A in accordance with aspects of the present subject matter, particularly following actuation of the sensing assembly relative to the ground-engaging tool.

Referring now to FIGS. 4A-4B various views of a portion of a ground-engaging tool of an agricultural implement and yet another embodiment of a sensing assembly for monitoring the soil composition within a field are illustrated in accordance with aspects of the present subject matter. More particularly, FIG. 4A illustrates a side view of the ground-engaging tool and the sensing assembly while a portion of the sensing assembly is in a first position. Additionally, FIG. 4B illustrates another side view of the ground-engaging tool and the sensing assembly following actuation of the sensing assembly relative to the ground-engaging tool from the first position shown in FIG. 4A.

In the embodiment shown, a sensing assembly 100" is provided relative to the coulter 42, with the sensing assembly 100" being configured substantially similar to the sensing assembly 100, 100'. For instance, the sensing assembly 100" includes a soil sensor 102" configured the same as or substantially similar to the sensor 102, 102' described above. The sensor 102" is positioned rearward or aft of the coulter 42 along the direction of travel 14 (e.g., within a trench or cut formed by the coulter 42) and is supported relative to the coulter 42 by a sensor arm 104". The sensor arm 104" is movable relative to the coulter 42 such that the sensor 102" moves relative to the coulter 42 to generate data indicative of the soil composition at different depths within the field. For instance, the sensor arm 104" is mounted to the support arm 50 by a linkage assembly 124". In particular, the linkage assembly 124" includes a support extension arm 126" that is fixed to the support arm 50. The sensor arm 104" is rotatably coupled to the support extension arm 126" about a second rotational axis 128" spaced apart from the rotational axis 44 of the coulter 42. The sensor arm 104" further comprises a slot 130" configured to receive a pin 132" of an actuating disc 134", where the actuating disc 134" is rotationally coupled to the coulter 42 for rotation about the rotational axis 44 of the coulter 42. The pin 132" is spaced apart from the rotational axis 44 of the coulter 42 such that, as the actuating disc 134" rotates with the coulter 42 as the implement 12 moves across the field, the pin 132" moves in a generally circular path and slides within the slot 130" of the sensor arm 104".

The sliding of the pin 132" within the slot 130" causes the sensor arm 104" to rotate about the second rotational axis 128" such that the sensor 102" translates substantially (almost completely or completely) in the vertical direction. For instance, the sensor 102" is in a raised position (FIG. 4A) when the actuating disc 134" is at a first rotational position corresponding to when the pin 132" is vertically above the rotational axis 44. Similarly, the sensor 102" is in a lowered position (FIG. 4B) when the actuating disc 134" is at a second rotational position corresponding to when the pin 132" is vertically below the rotational axis 44. As the actuating disc 134" rotates, the sensor 102" is moved cyclically between such raised and lowered positions.

When the sensor 102" is in the raised position (FIG. 4A), the sensor 102" is configured to generate data indicative of the soil composition at a first depth 108" below the field surface. When the sensor 102" is in the lowered position (FIG. 4B), the sensor 102" is configured to generate data indicative of the soil composition at a second depth 110" below the field surface, where the second depth 110" is deeper than the first depth 108". In some embodiments, the second depth 110" corresponds to the penetration depth of the coulter 42. However, in other embodiments, the second depth 110" may correspond to any other distance below the field surface. It should be appreciated that the actuating disc 134" and the associated pin 132" and/or the slot 132" within the sensor arm 104" may be configured such that the pin 132" may move the sensor arm 104" such that the sensor 102" may be positioned at any position between the raised and lowered positions to generate data indicative of the soil composition of the field at an associated depth(s) between the first and second depths 108", 110".

The depth at which the sensor 102" generates the data indicative of the soil composition may be monitored using a depth sensor(s) 150" (FIG. 6). In one embodiment, the depth sensor(s) 150" may be configured as a rotational sensor configured to monitor the rotation of the actuating disc 134" or coulter 42 about the rotational axis 44 and/or of the sensor arm 104" about the second rotational axis 128". However, it should be appreciated that the depth sensor(s) 150" may be configured as any other suitable sensor for monitoring the depth of the sensor 102".

It should also be appreciated that the sensor arm 104" may include any suitable number of soil sensors 102". For example, in one embodiment, the sensor arm 104" may only include one soil sensor 102". However, in other embodiments, the sensor arm 104" may include a plurality of soil sensors 102". In such an embodiment, several soil sensors 102" may be installed at different locations along the sensor arm 104" such that the soil composition at multiple depths may be taken at one position of the sensor arm 104".

Figure 5:
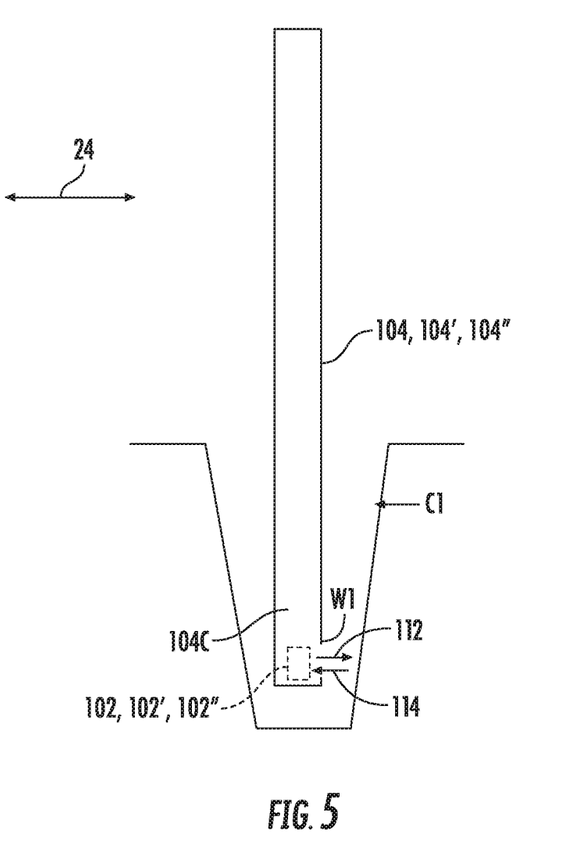
FIG. 5 illustrates a rear view of a component of a sensing assembly for monitoring the soil composition within a field, particularly illustrating a sensor and a sensor arm of the sensing assembly in accordance with aspects of the present subject matter.

Referring now to FIG. 5, a rear view of the sensing assembly 100, 100', 100" along the direction of travel 14 is shown, particularly illustrating the sensor 102, 102', 102" and the sensor arm 104, 104', 104" of the sensing assembly 100, 100', 100" in accordance with aspects of the present subject matter. In one embodiment, the sensor 102, 102', 102" may be configured as a multi-spectral sensor which emits an output signal(s) (e.g., as indicated by arrow 112) for reflection off of the soil and receives the reflected output signals as a return signal(s) (e.g., as indicated by arrow 114), with such return signals 114 being indicative of the soil composition at the depth of the sensor 102, 102', 102". The sensor 102, 102', 102" may be mounted or positioned on the sensor arm 104, 104', 104" in any suitable manner that permits the sensor 102, 102', 102" to emit the output signal(s) 112 towards a lateral side of a cut Cl formed in the field by the coulter 42 and receive the reflected return signal(s) 114. For example, in the illustrated embodiment, the sensor 102, 102', 102" may be positioned within a cavity 104C of the sensor arm 104, 104', 104" having an opening/window W1 such that the output signal(s) 112 emitted by the sensor 102, 102', 102" and the reflected return signal(s) 114 detected by the sensor 102, 102', 102" may pass through the opening/window W1. In some embodiments, the opening/window W1 has a transparent or translucent covering that prevents soil/moisture from entering the cavity 104C of the sensor arm 104, 104', 104", while still allowing emitted output signal(s) 112 to exit and reflected return signal(s) 114 to enter the cavity 104A. However, in alternative embodiments, the sensor 102, 102', 102" may be mounted to any other suitable portion of the sensor arm 104, 104', 104", such as on an outer surface of the sensor arm 104, 104', 104".

It should be appreciated that the soil sensor 102, 102', 102" may generally correspond to any suitable sensing device configured to function as described herein. For example, in one embodiment, the sensor 102, 102', 102" may include an emitter(s) configured to emit an electromagnetic radiation signal(s), such as an ultraviolet radiation signal(s), a near-infrared radiation signal(s), a mid-infrared radiation signal(s), or a visible light signal(s) for reflection off of the soil. The soil sensor 102, 102', 102" may also include a receiver(s) configured to receive the reflected electromagnetic radiation signal(s). One or more spectral parameter(s) (e.g., the amplitude, frequency, and/or the like) of the reflected electromagnetic radiation signal(s) may, in turn, be indicative of the soil composition. In this regard, the emitter(s) may be configured as a light-emitting diode (LED(s)) or other electromagnetic radiation-emitting device(s) and the receiver(s) may be configured as a photo resistor(s) or other electromagnetic radiation-receiving device(s). However, in alternative embodiments, the sensor 102, 102', 102" may have any other suitable configuration and/or components.

Referring now to FIG. 6, a schematic view of one embodiment of a system 200 for monitoring the soil composition at different depths within a field as an agricultural implement moves across the field is illustrated in accordance with aspects of the present subject matter. In general, the system 200 will be described herein with reference to the implement 12 described above with reference to FIG. 1, as well as the ground-engaging tool and the associated system components described above with reference to FIGS. 2A-5. However, it should be appreciated by those of ordinary skill in the art that the disclosed system 200 may generally be utilized with agricultural implements having any other suitable implement configuration and/or any other suitable ground-engaging tools. Additionally, it should be appreciated that, for purposes of illustration, communicative links or electrical couplings of the system 200 shown in FIG. 6 are indicated by dashed lines.

In several embodiments, the system 200 may include a controller 202 and various other components configured to be communicatively coupled to and/or controlled by the controller 202, such as a sensing assembly (e.g., the sensing assembly 100, 100', 100") having one or more sensors that are used to detect one or more parameters associated with the soil composition within the field (e.g., soil sensor(s) 102, 102', 102", depth sensor(s) 150, 150', 150", and/or the like) and having one or more actuators (e.g., actuator(s) 106, 118', 134") configured to actuate the associated sensor(s) 102, 102', 102". The system 200 may further include a user interface (e.g., user interface 210). The user interface 210 described herein may include, without limitation, any combination of input and/or output devices that allow an operator to provide inputs to the controller 202 and/or that allow the controller 202 to provide feedback to the operator, such as a keyboard, keypad, pointing device, buttons, knobs, touch sensitive screen, mobile device, audio input device, audio output device, and/or the like.

In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 12 and/or of the work vehicle to which the implement 12 is coupled. However, it should be appreciated that, in other embodiments, the controller 202 may instead correspond to a separate processing device. For instance, in one embodiment, the controller 202 may form all or part of a separate plug-in module that may be installed within the agricultural implement 12 to allow for the disclosed system and method to be implemented without requiring additional software to be uploaded onto existing control devices of the agricultural implement 12.

In some embodiments, the controller 202 may be configured to include a communications module or interface 208 to allow for the controller 202 to communicate with any of the various system components described herein. For instance, one or more communicative links or interfaces (e.g., one or more data buses) may be provided between the communications interface 208 and the sensor(s) 102, 102', 102", 150, 150', 150" to allow data to be transmitted from the sensor(s) 102, 102', 102", 150, 150', 150" to the controller 202. Similarly, one or more communicative links or interfaces (e.g., one or more data buses) may be provided between the communications interface 208 and the actuator (s) 106 to allow the controller 202 to control the operation of one or more components of the actuator(s) 106. Additionally, one or more communicative links or interfaces (e.g., one or more data buses) may be provided between the communications interface 208 and a user interface (e.g., user interface 210) to allow operator inputs to be received by the controller 202 and/or to allow the controller 202 to control the operation of one or more components of the user interface 210.

As described above, the soil sensor(s) 102, 102', 102" may be configured to emit output signal(s) 112 for reflection off of the soil within cuts formed within the field by the associated ground-engaging tool (e.g., coulter 42). Moreover, the soil sensor(s) 102, 102', 102" may be configured to detect the reflected output signal(s) as a return signal(s) 114, with one or more parameters of the return signal(s) 114 being indicative of the soil composition at the depth of the sensor(s) 102, 102', 102" within the field. In this regard, the controller 202 may be configured to receive data from the soil sensor(s) 102, 102', 102", and optionally from the depth sensor(s) 150, 150', 150", associated with the detected return signal(s) 114. In some embodiments, the sensor(s) 102, 102', 102" may be configured to continuously or periodically capture data associated with a portion of the field. In such embodiments, the data transmitted to the controller 202 from the sensor(s) 102, 102', 102" may be stored within the memory 206 of the controller 202 and/or be transmitted to a remote device (e.g., a Smartphone, a tablet, a PC, a database server, and/or the like) for subsequent processing and/or analysis.

In some embodiments, such as the embodiment described with reference to FIGS. 2A-2B, the controller 202 may be configured to control the depth of the sensor(s) 102 relative to the associated coulter 42 while the implement 12 moves across the field. For instance, in such embodiments, each sensing assembly 100 includes an actuator(s) (e.g., the actuator(s) 106) associated with the sensor arm 104. In such embodiments, the controller 202 may be configured to control the actuator(s) 106 to move the sensor arm(s) 104 such that the sensor(s) 102 moves between the raised and lowered positions 108, 110 relative to the coulter 42 while the implement 12 moves across the field. In some embodiments, the controller 202 may control the actuator(s) 106 such that the sensor(s) 102 cyclically move between the raised and lowered positions 108, 110 to generate data indicative of the soil composition at multiple depths within the field. However, the controller 202 may be configured to control the actuator(s) 106 to move the sensor(s) 102 in any other suitable pattern or manner. For instance, in some embodiments, the controller 202 may control the actuator(s) 106 to adjust the position of the sensor arm(s) 104 to move the sensor(s) 102 between the raised and lowered positions 108, 110 based on a depth input received from an operator of the implement 12 (e.g., via the user interface 210) indicative of adjusting the depth of the sensor 102. As indicated above, the depth at which the sensor(s) 102 generates the data indicative of the soil composition may, in such embodiment, be simultaneously monitored based on the actuation (e.g., extension, retraction, rotation, and/or the like) of the actuator(s) 106 and/or using a separate depth sensor (e.g., depth sensor(s) 150).

In other embodiments, such as the embodiment described with reference to FIGS. 3A-4B, the sensor(s) 102 may be moved automatically with movement of the implement 12 across the field, without active control of the associated actuator. For instance, in the embodiment shown in FIGS. 3A-3B, each sensing assembly 100' includes an actuator (e.g., cam 118') configured to rotate with the coulter 42 about the rotational axis 44 in a manner that moves the associated sensor arm 104' such that the sensor(s) 102' moves between the raised and lowered positions 108', 110' relative to the coulter 42 while the implement 12 moves across the field. Similarly, in the embodiment shown in FIGS. 4A-4B, each sensing assembly 100" includes an actuator (e.g., actuating disc 134") configured to rotate with the coulter 42 about the rotational axis 44 in a manner that moves the associated sensor arm 104" such that the sensor(s) 102" moves between the raised and lowered positions 108", 110" relative to the coulter 42 while the implement 12 moves across the field. The depth at which the sensor(s) 102', 102" generate the data indicative of the soil composition may, in such embodiment, be simultaneously monitored using the depth sensor(s) 150', 150" described above.

The controller 202 may be configured to analyze/process the received data to determine the soil composition within the field. For instance, the controller 202 may include a look-up table(s), suitable mathematical formula, and/or algorithms stored within its memory 206 that correlates the received data to the soil composition at the associated depth within the field. The controller 202 may store the determined soil composition within its memory 206 and/or transmit the determined soil composition of the field to a remote device (e.g., a Smartphone, a tablet, a PC, a database server, and/or the like). Such soil composition data may, in turn, be used in planning and/or performing subsequent agricultural operations.

It should be appreciated that the determined soil composition of the field may provide an indication of the amounts and/or concentrations of one or more constituents or components of the soil at an associated depth within the field. For example, in one embodiment, the determined soil composition may provide an indication of the amount and/or concentration of organic matter, nutrients (e.g., nitrogen, phosphorous, potassium, iron, magnesium, calcium, sulfur, and/ or the like), residue, and/or moisture within the soil at the associated sensor depth, which may further be an indicator of soil type (e.g., loam, clay, silt, sand, and/or the like). However, in alternative embodiments, the determined soil composition may provide an indication any other suitable constituent or component of the soil at the associated sensor depth.

Additionally, the controller 202 may be configured to generate a field map (e.g., a graphical field map) identifying the soil composition at a plurality of locations and depths within the field. More specifically, in several embodiments, the data generated by the sensor(s) 102, 102', 102" may be geo-referenced or may otherwise be stored with corresponding location data associated with the specific location at which such data was collected within the field. In one embodiment, the data may be correlated to a corresponding position within the field based on location data received from one or more positioning devices. For instance, the controller 202 may be communicatively coupled to a positioning device(s) 212, such as a Global Positioning System (GPS) or another similar positioning device, configured to transmit a location corresponding to a position of the sensor (s) 102, 102', 102" within the field when the data is collected by the sensor(s) 102, 102', 102".

Thus, the controller 202 may be configured to execute one or more algorithms stored within its memory 206 that generate the field map based on the data received from the soil sensor(s) 102, 102', 102" and the positioning device(s) 212. In some embodiments, the controller 202 may be configured to extrapolate the soil composition for different depths at each position in the field from the data generated by the sensor(s) 102, 102', 102". Additionally, in some embodiments, the controller 202 may be configured to transmit instructions to the user interface 210 instructing the user interface 210 to display the generated field map (e.g., a graphical field map).

It should be appreciated that, while the system 200 has generally been described herein with reference to monitoring the soil composition of a field using a sensor 102, 102', 102" that is movable relative to a coulter 42 of an agricultural implement 12, the system 200 may be configured to be associated with any other ground-engaging tools or ground-engaging assemblies of any suitable implement.

Figure 7:
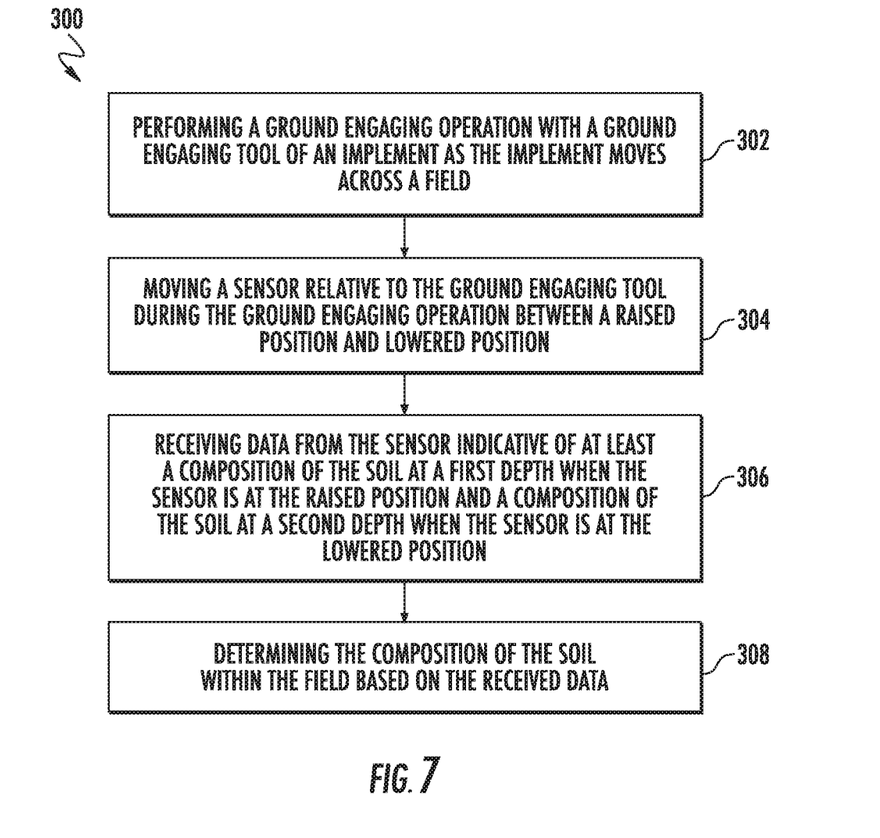
FIG. 7 illustrates a flow diagram of one embodiment of a method for monitoring the soil composition within a field in accordance with aspects of the present subject matter.

Referring now to FIG. 7, a flow diagram of one embodiment of a method 300 for monitoring the soil composition at different depths within a field as an agricultural implement moves across the field is illustrated in accordance with aspects of the present subject matter. In general, the method 300 will be described herein with reference to the implement 12 shown in FIG. 1, as well as the sensing assembly 100, 100', 100" shown in FIGS. 2A-5 and the various system components shown in FIG. 6. However, it should be appreciated that the disclosed method 300 may be implemented with work vehicles and/or implements having any other suitable configurations, with sensing assemblies having any other suitable configurations, and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include performing a ground engaging operation with a ground engaging tool of an implement as the implement moves across a field. For instance, as indicated above, the implement 12 may be moved across the field while one or more ground-engaging tools (e.g., coulters 42, shanks 46, and/or the like) engage the soil within the field.

Further, at (304), the method 300 may include moving a sensor relative to the ground engaging tool during the ground engaging operation between a raised position and a lowered position. For example, as provided above, a soil sensor 102, 102', 102" may be supported relative to one of the ground-engaging tools (e.g., coulter 42) such that it is movable relative to the associated ground-engaging tool between a raised position (FIG. 2A, FIG. 3A, or FIG. 4A) and a lowered position (FIG. 2B, FIG. 3B, or FIG. 4B). The soil sensor 102, 102', 102" may be configured to generate data indicative of the soil composition at different depths within the field depending on the position of the sensor 102, 102', 102". In some embodiments, the controller 202 may be configured to control the associated actuator (e.g., actuator 106) to move the sensor 102 relative to the ground-engaging tool. However, in other embodiments, the sensor 102', 102" may move automatically, without active control of the associated actuator (e.g., actuators 118', 134"), relative to the ground-engaging tool.

Moreover, at (306), the method 300 may include receiving data from the sensor indicative of at least a composition of the soil at a first depth when the sensor is at the raised position and a composition of the soil at a second depth when the sensor is at the lowered position. For instance, when the sensor 102, 102', 102" is in its raised position (FIG. 2A, FIG. 3A, or FIG. 4A), the controller 202 may receive data indicative of the soil composition of the field at a first depth 108, 108', 108" below the field surface from the sensor 102, 102', 102". Similarly, when the sensor 102, 102', 102" is in its lowered position (FIG. 2B, FIG. 3B, or FIG. 4B), the controller 202 may receive data indicative of the soil composition of the field at a second depth 110, 110', 110" below the field surface from the sensor 102, 102', 102", where the second depth 110, 110', 110" is further below the field surface than the first depth 108, 108', 108".

Additionally, at (308), the method 300 may include determining the composition of the soil within the field based on the received data. For example, as indicated above, the received data may be geo-referenced or otherwise stored with corresponding location data associated with the specific location at which such data was collected within the field such that the controller 202 may determine the soil composition of the field at different locations and associated depths within the field based at least in part on the data received from the sensor 102, 102', 102".

It should be appreciated that, while the method 300 has generally been described herein with reference to monitoring the soil composition of a field using a sensor 102 that is movable relative to a coulter 42 of an agricultural implement 12, the method 300 may be configured to be used in association with any other ground-engaging tools or ground-engaging assemblies of any suitable implement.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring soil composition within a field, the system comprising:
    a ground-engaging tool configured to engage soil within a field as an implement moves across the field;
    a sensor configured to generate data indicative of a soil composition within the field;
    an actuator configured to move the sensor relative to the ground-engaging tool to different depths within the field as the implement moves across the field such that the data generated by the sensor is indicative of the soil composition at the different depths within the field; and
    a controller communicatively coupled to the sensor, the controller being configured to determine the soil composition at the different depths within the field based at least in part on the data generated by the sensor.

2. The system of claim 1, wherein the actuator comprises one of a linear actuator or a rotary actuator.

3. The system of claim 1, wherein the controller is further configured to control an operation of the actuator to move the sensor relative to the ground-engaging tool to the different depths within the field.

4. The system of claim 1, wherein the ground-engaging tool and the sensor are rotatable about a rotational axis.

5. The system of claim 1, wherein the actuator is rotationally coupled to the ground-engaging tool, the actuator and the ground-engaging tool being rotatable about a first rotational axis, the actuator being configured to move the sensor relative to the ground-engaging tool as the actuator rotates about the first rotational axis.

6. The system of claim 5, further comprising a support arm, the support arm being configured to support the ground-engaging tool for rotation about the first rotational axis and to support the sensor for rotation about a second rotational axis, the first and second rotational axes being spaced apart from each other.

7. The system of claim 1, wherein the sensor is movable between a raised position and a lowered position, the data generated by the sensor being indicative of the soil composition at a first depth when the sensor is in the raised position and the soil composition at a second depth when the sensor is in the lowered position.

8. The system of claim 7, wherein the sensor is cyclically movable between the raised and lowered positions as the implement moves across the field.

9. The system of claim 1, wherein the sensor comprises a multi-spectral sensor configured to emit an output signal for reflection off of the soil within the field and detect the reflected output signal as a return signal, the return signal being indicative of the soil composition within the field.

10. The system of claim 9, wherein the output signal comprises an electromagnetic radiation signal.

11. The system of claim 1, wherein the sensor is positioned aft of the ground-engaging tool along a direction of travel of the implement.

12. The system of claim 1, wherein the controller is further configured to generate a field map identifying the soil composition at a plurality of locations within the field.

13. The system of claim 1, wherein the soil composition comprises an amount or a concentration of at least one of organic matter, nutrients, crop residue, or moisture within the soil.

14. The system of claim 1, wherein the ground-engaging tool is a coulter or a disk opener.

15. A method for collecting soil composition data within a field as an implement moves across a field, the implement having a ground-engaging tool, the method comprising:
    performing a ground-engaging operation with the ground-engaging tool of the implement as the implement moves across the field;
    controlling an operation of an actuator to move a sensor relative to the ground-engaging tool during the ground-engaging operation between a raised position and a lowered position, the sensor being configured to generate data indicative of a soil composition within the field;
    receiving, with a computing device, the data generated by the sensor indicative of at least the soil composition at a first depth when the sensor is in the raised position and the soil composition at a second depth when the sensor is in the lowered position; and
    determining, with the computing device, the soil composition within the field based on the data.

16. The method of claim 15, wherein controlling the operation of the actuator to move the sensor relative to the ground-engaging tool comprises controlling the operation of the actuator to cyclically move the sensor relative to the ground-engaging tool between the raised and lowered positions.

17. The method of claim 15, wherein the actuator is rotationally fixed to the ground-engaging tool for rotation about a rotational axis,
    wherein controlling the operation of the actuator to move the sensor relative to the ground-engaging tool comprises controlling the operation of the actuator to rotate about the rotational axis as the ground-engaging tool moves across the field.

18. The method of claim 15, further comprising receiving, with the computing device, a depth input associated with adjusting a depth of the sensor,
   wherein controlling the operation of the actuator to move the sensor relative to the ground-engaging tool comprises controlling the operation of the actuator based at least in part on the depth input to move the sensor between the raised and lowered positions.

19. The method of claim 15, further comprising generating, with the computing device, a field map identifying the soil composition at a plurality of locations within the field.

* * * * *